US008265194B2

(12) United States Patent
Shoemake et al.

(10) Patent No.: US 8,265,194 B2
(45) Date of Patent: *Sep. 11, 2012

(54) VIRTUAL SIDE CHANNELS FOR DIGITAL WIRELESS COMMUNICATION SYSTEMS

(75) Inventors: Matthew B. Shoemake, Allen, TX (US); Sridhar Rajagopal, Allen, TX (US); David G. Brenner, Plano, TX (US)

(73) Assignee: QUALCOMM Incorporated, San Diego, CA (US)

( * ) Notice: Subject to any disclaimer, the term of this patent is extended or adjusted under 35 U.S.C. 154(b) by 2161 days.

This patent is subject to a terminal disclaimer.

(21) Appl. No.: 11/114,646

(22) Filed: Apr. 25, 2005

(65) Prior Publication Data

US 2005/0237922 A1 Oct. 27, 2005

Related U.S. Application Data

(60) Provisional application No. 60/565,483, filed on Apr. 26, 2004.

(51) Int. Cl.
*H04L 27/00* (2006.01)
(52) U.S. Cl. ........ 375/295; 375/260; 375/264; 375/261; 375/298; 375/299; 375/267; 370/208; 370/296
(58) Field of Classification Search .......... 370/208, 370/296; 375/295, 260, 346, 222, 219, 269, 375/279, 362, 355, 308, 334, 264, 261, 298, 375/299, 267; 708/5, 8, 21, 404
See application file for complete search history.

(56) References Cited

U.S. PATENT DOCUMENTS

| 5,493,582 | A  | * | 2/1996  | Flynn et al. ................... 375/219 |
| 5,642,354 | A  | * | 6/1997  | Spear ............................ 370/329 |
| 6,510,133 | B1 | * | 1/2003  | Uesugi ........................ 370/208 |
| 7,055,086 | B2 | * | 5/2006  | Lam .............................. 714/776 |
| 7,319,659 | B2 | * | 1/2008  | Tsuie ........................... 370/203 |
| 7,417,945 | B2 | * | 8/2008  | Dey et al. ..................... 370/208 |
| 2001/0053143 | A1 | * | 12/2001 | Li et al. ........................ 370/344 |
| 2002/0117560 | A1 | * | 8/2002  | Igashira et al. ............ 239/585.1 |
| 2002/0154611 | A1 | * | 10/2002 | Khullar ........................ 370/329 |
| 2004/0022181 | A1 | * | 2/2004  | Coffey ......................... 370/208 |
| 2004/0072573 | A1 | * | 4/2004  | Shvodian ..................... 455/450 |
| 2004/0081123 | A1 | * | 4/2004  | Krishnan et al. ............. 370/329 |
| 2004/0121772 | A1 | * | 6/2004  | Rue .............................. 455/436 |
| 2004/0131011 | A1 |   | 7/2004  | Sandell et al. |
| 2004/0151109 | A1 | * | 8/2004  | Batra et al. .................. 370/208 |
| 2004/0160987 | A1 | * | 8/2004  | Sudo et al. ................... 370/480 |

(Continued)

OTHER PUBLICATIONS

Weinstein et al., "Data Transmission by Frequency-Division Multiplexing Using the Discrete Fourier Transform", IEEE Transactions on Communication Technology, Vol. COM-19, No. 5, Oct. 1971, pp. 628-634.

(Continued)

*Primary Examiner* — David Ometz
*Assistant Examiner* — Rahel Guarino
(74) *Attorney, Agent, or Firm* — Nicholas J. Pauley; Peter Michael Kamarchik; Jonathan T. Velasco

(57) ABSTRACT

The present invention provides a method for enabling side channel communication between wireless devices. In one embodiment of the invention the guard tones in wireless OFDM signals are used for side channel communication. In another embodiment of the invention, unused bits in OFDM symbols are used as side channels instead of being padded with zeros or random bits.

29 Claims, 4 Drawing Sheets

U.S. PATENT DOCUMENTS

2005/0117560 A1* 6/2005 Thubert et al. .............. 370/349
2005/0135457 A1* 6/2005 Molisch et al. .............. 375/130
2005/0232137 A1* 10/2005 Hosur et al. ................ 370/208
2005/0271088 A1 12/2005 Shoemake et al.

OTHER PUBLICATIONS

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

* cited by examiner

VIRTUAL SIDE CHANNELS FOR DIGITAL WIRELESS COMMUNICATION SYSTEMS

CROSS-REFERENCE TO RELATED APPLICATIONS

This application claims the benefit of and priority to U.S. Provisional Patent Application No. 60/565,483 filed Apr. 26, 2004 the technical disclosures of which are hereby incorporated herein by reference.

TECHNICAL FIELD

The present invention relates generally to wireless communications systems, such as a multi-band OFDM (Orthogonal Frequency Division Multiplexing) communication system. More specifically, the present invention relates to a method for simulating side channels by using unused bits left open by the signal standards.

BACKGROUND OF THE INVENTION

In a conventional serial data system, symbols are transmitted sequentially, with the frequency spectrum of each data symbol allowed to occupy the entire bandwidth. A parallel data transmission system is one in which several sequential streams of data are transmitted simultaneously. In a parallel system, the spectrum of an individual data element normally occupies only a small part of the available bandwidth.

In a classic parallel data system, the total signal frequency band is divided into N overlapping frequency subchannels. Each subchannel is modulated with a separate symbol. The subchannels are then multiplexed.

Orthogonal signals can be separated at the receiver by using correlation techniques, eliminating inter-symbol interference. This can be achieved by carefully selecting carrier spacing so as to let the carrier spacing equal the reciprocal of the useful symbol period. Orthogonal Frequency Division Multiplexing (OFDM) is a form of multicarrier modulation wherein carrier spacing is selected so that each subcarrier is orthogonal to the other subcarriers.

This orthogonality avoids adjacent channel interference and prevents the demodulators from seeing frequencies other than their own. The benefits of OFDM are high spectral efficiency, resiliency to Radio Frequency (RF) interference, and lower multi-path distortion.

In OFDM the subcarrier pulse used for transmission is chosen to be rectangular. This has the advantage that the task of pulse forming and modulation can be performed by a simple Inverse Discrete Fourier Transform (IDFT) which can be implemented very efficiently as an Inverse Fast Fourier Transform (IFFT). Therefore, the receiver only needs a FFT to reverse this operation.

Incoming serial data is first converted from serial to parallel and grouped into x bits each to form a complex number. The number x determines the signal constellation of the corresponding subcarrier, such as 16 Quadrature Amplitude Modulation. The complex number are modulated in a baseband fashion by the IFFT and converted back to serial data for transmission. A guard symbol is inserted between symbols to avoid inter-symbol interference (ISI) caused by multi-path distortion. The discrete symbols are converted to analog and low-pass filtered for RF up-conversion. The receiver then simply performs the inverse process of the transmitter.

According to the theorems of the Fourier Transform the rectangular pulse shape will lead to a sin(x)/x type of spectrum of the subcarriers, as illustrated in FIG. 1. The spectrums of the subcarriers are not separated but overlap. The reason why the information transmitted over the carriers can be separated is the orthogonality relation. By using an IFFT for modulation, the spacing of the subcarriers is chosen such that at the frequency where a received signal is evaluated (indicated by letters A-E in FIG. 1) all other signals are zero.

The seminal article on OFDM is "Data Transmission by Frequency-Division Multiplexing Using the Discrete Fourier Transform", by S. B. Weinstein and Paul M. Ebert in *IEEE Transactions on Communication Technology*, Vol. com-19, No. 5, October 1971, the contents of which are hereby incorporated by reference.

OFDM forms the basis for the Digital Audio Broadcasting (DAB) standard in the European market as well as the basis for the global Asymmetric Digital Subscriber Line (ADSL) standard. Development is ongoing for wireless point-to-point and point-to-multipoint configurations for Wireless Local Area Networks using OFDM technology. In a supplement to the IEEE 802.11 standard, the IEEE 802.11 working group published IEEE 802.11a, which outlines the use of OFDM in the 5.8-GHz band.

Robustness is a key concern in wireless communication systems. One way to make a wireless link more robust is to have a side channel. The side channel may be used to move information from the transmitter to the receiver or vice versa. Although the side channel typically has a lower data rate than the main channel, the information communicate on the side channel may allow for quick link optimization and performance enhancements which result in robustness.

Some wireless communication systems are full-duplex, having natural bi-directional communication. However, other half-duplex systems such as Wireless Local Area Network (WLAN) systems (e.g., IEEE 802.11) and Wireless Personal Area Network (WPAN) systems (e.g., IEEE 802.15.3) have no side channel communication. The only feedback tends to be acknowledgement (ACK) packets that are sent from the receiver to the transmitter to confirm the proper receipt of a data packet. An ACK packet is a binary indication that the data packet was received and decoded properly but conveys no other information to the transmitting device.

Therefore, it would be desirable to provide side channel functionality for half-duplex systems such as WLAN and WPAN systems.

SUMMARY OF THE INVENTION

The present invention provides a method for enabling side channel communication between wireless devices. In one embodiment of the invention the guard tones in wireless OFDM signals are used for side channel communication. In another embodiment of the invention, unused bits in OFDM symbols are used as side channels instead of being padded with zeros or random bits.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
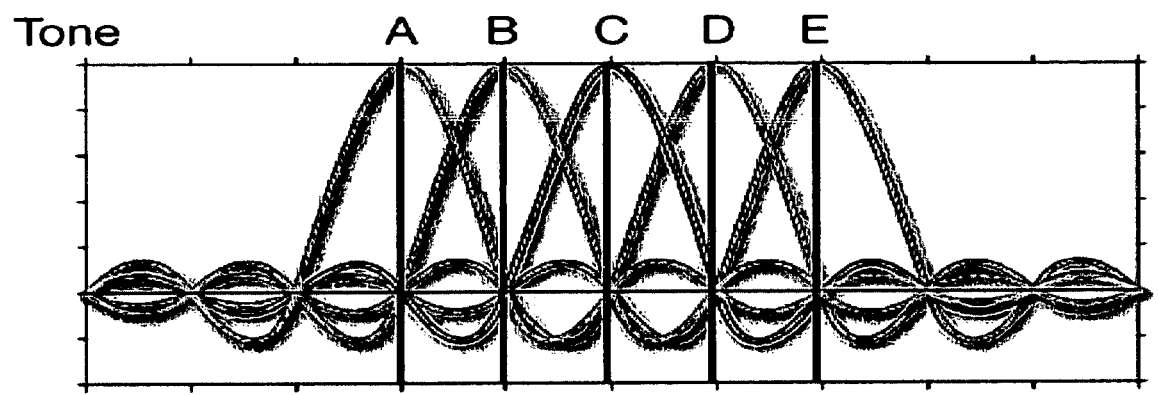
FIG. 1 shows an OFDM signal.
Figure 2:
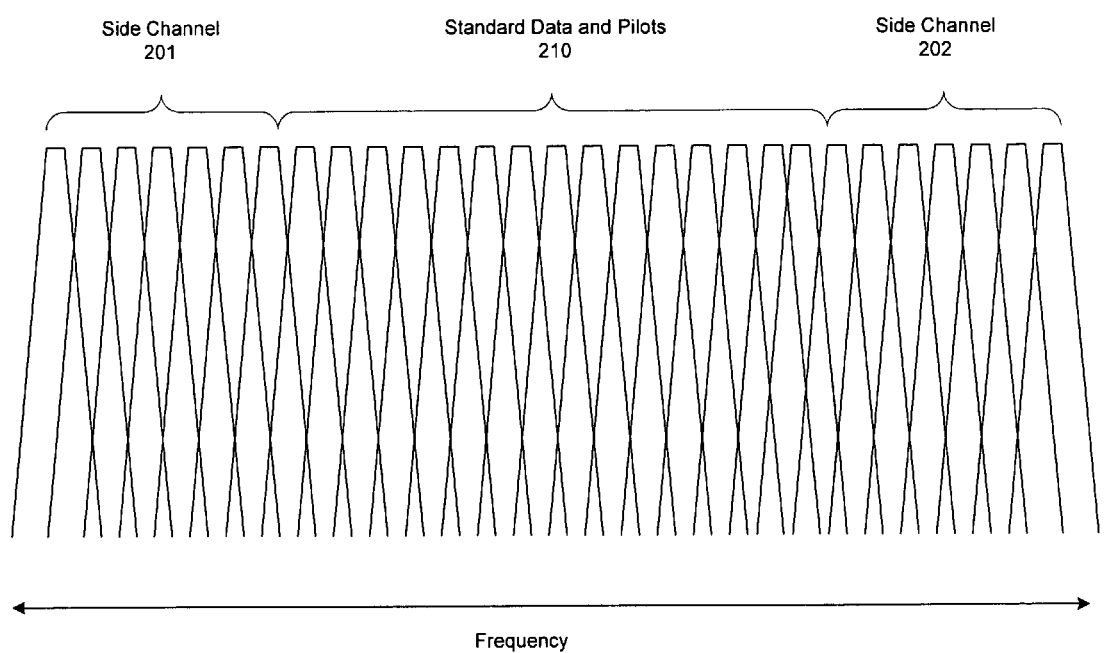
FIG. 2 illustrates the relationship between the main and side channels in the frequency domain.

FIG. 2 illustrates the relationship between the main and side channels in the frequency domain. The side channels 201, 202 modulate data beside the main data and pilot tones 210 in the frequency domain. In practice, the side channel tones can be viewed as a channel to communicate information between two devices in the network without causing the devices to be non-compliant with the standard specifications for the data tones and pilot tones.

Side channels are often bits that are left open by the standard for use by developers in customizing their designs. For example, the open bits may be left unused in order to minimize system complexity. Alternately, the open bits may be used to create higher performance systems that can tolerate more complexity.

In the example depicted in FIG. 2, the side channels 201, 202 are specifically side channels over tones, which lie completely outside the frequencies occupied by the standard data and pilots tones. However, as will be discussed in more detail below, there may also be side channels amongst the standard data and pilot tones 210.

Figure 3:
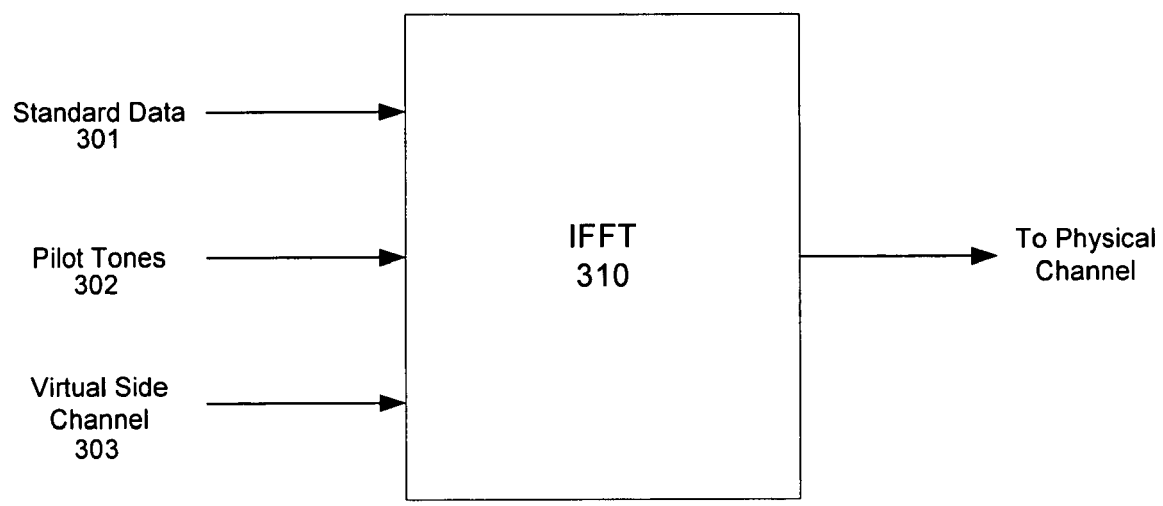
FIG. 3 shows an Inverse Fast Fourier Transform (IFFT) in accordance with the present invention.

FIG. 3 shows an Inverse Fast Fourier Transform (IFFT) in accordance with the present invention. The main data components that are fed into the IFFT 310 are the standard data 301, the pilot tones 302, and virtual side channel 303. The standard data 301 included the information contents of the signal. The pilot tones 302 are known tones that are used to inform the receiver as to the face of the signal. The pilot tones are used to correct any clock mismatch between the transmitter and receiver.

In a preferred embodiment of the present invention, the virtual side channel 303 comprises the guard tones in a wireless Orthogonal Frequency Division Multiplexing (OFDM) system are utilized. Guard tones in this context are the same as those defined in the Multiband OFDM proposal to the IEEE 802.15.3a committee, which is hereby incorporated by reference. There are 10 guard tones in the standard. These tones must be transmitted upon, but what is modulated on them is left to the implementer. The present invention uses these guard tones, or a subset thereof, to provide a feedback (side) channel for wireless communication. The guard tone can be used to increase the data rate or to convey information about system characteristics.

Figure 4:
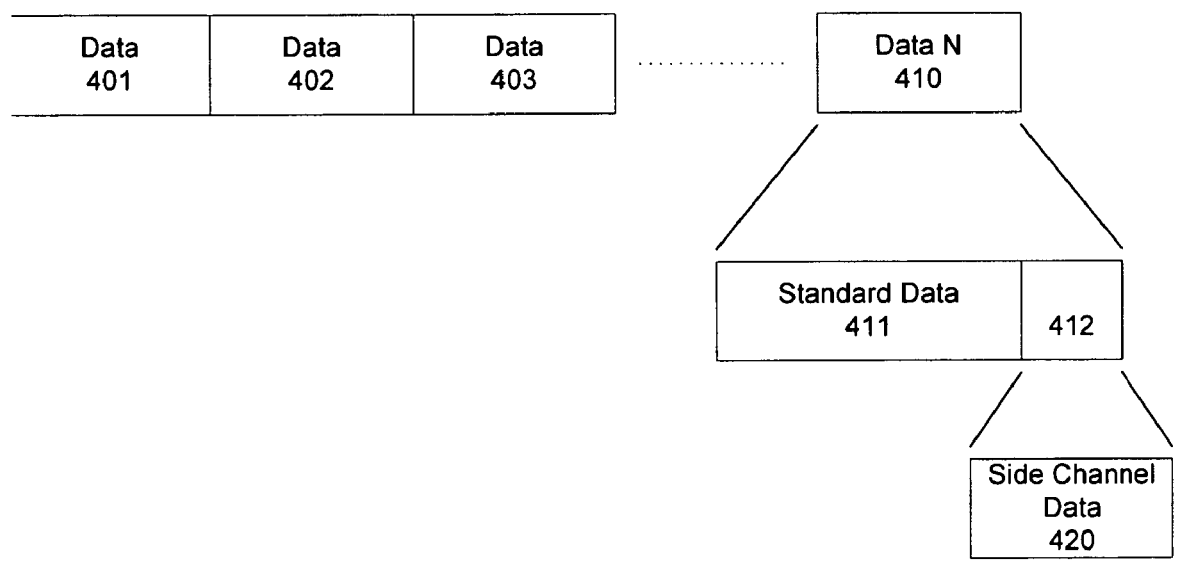
FIG. 4 shows the data structure for using Acknowledgment packets as side channels.

FIG. 4 shows the data structure for using Acknowledgment packets as side channels. Acknowledgement (ACK) packets in Wireless Local Area Network (WLAN) and Wireless Personal Area Network (WPAN) systems typically have a fixed amount of data (e.g., 14 bytes). However, the minimum number of OFDM symbols may be able to carry much more information than 14 bytes (112 bits) of data. For example, at 480 Mbps, the Multiband OFDM proposal to the IEEE 802.15.3a Task Group can transport approximately 480 Mbps*0.3125 us=150 bits of data. In this physical layer system, the remainder of the OFDM symbol is typically padded with zeros or random bits.

Furthermore, in OFDM systems, the number of bits that may be carried tends to be an integer number of some number of bits (e.g., N×150 bits). Therefore, there is a high probability that some padding of zeros or random bits will be required.

For example, the data packets 401, 402, 403, 410 may carry 1800 bits, but the data content is only 1730 bits. In this case, the remaining 70 bits would comprise padding. The structure of Data N 410 depicts the relationship between the standard data content 411 and the unused portion 412 that is typically comprised of padding.

In the present invention, the extra bits 412 in the OFDM symbols are not padded with zeros or random but instead are used as a side channel 420. Again, such an implementation allows the device in question to remain fully interoperable with other devices. However, those other devices that are aware of the side channel may use it to convey information that enhances performance.

While the side channels over tones 201, 202 are constant, the side channels within the standard data (e.g. 420) may vary.

The existence of the side channel may be communicated between devices via several mechanisms. These include signaling during association, high level signaling after association, a cyclic redundancy check (CRC) in the data, a fixed pattern in the data, and a fixed pattern on a specific guard tone.

The virtual side channels provided by the present invention also allow for quick link optimization. Transmitters may operate within a range of power, data rate, signal strength, etc. In quick link optimization, the receiver provides feedback to the transmitter regarding the quality of the channel, which allows the transmitter to adjust the above parameters accordingly to compensate for effects on the channel (e.g., multipath distortion).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A method for providing side channel communication between wireless communication devices, the method comprising:
   (a) identifying, by an apparatus, a set of guard tones in wireless Orthogonal Frequency Division Multiplexing (OFDM) signals; and
   (b) transmitting, by the apparatus, a side channel communication over a portion of said set of guard tones, wherein the existence of the side channel is communicated to or by the apparatus by using a fixed pattern on a specific OFDM guard tone, wherein the side channel communication is used for link optimization and the link optimization includes providing feedback regarding the quality of a communication said wireless communication devices.

2. The method according to claim 1, wherein the wireless OFDM signals comply with an industry standard for OFDM systems.

3. The method according to claim 1, wherein the existence of the side channel is communicated by using at least one of the following mechanisms: signaling during association; high level signaling after association; a cyclic redundancy check in the data; and a fixed pattern in the data.

4. The method according to claim 1, wherein the portion of said set of guard tones is used to convey information about a system that includes said wireless communication devices.

5. The method according to claim 1, wherein the portion of said set of guard tones is used to increase a data rate associated with a system that comprises said wireless communication devices.

6. The method according to claim 1, wherein the side channel communication includes information that enhances performance of a system that comprises said wireless communication devices.

7. A method for providing side channel communication between wireless communication devices, the method comprising:
   (a) identifying, by an apparatus, unused bits in wireless Orthogonal Frequency Division Multiplexing (OFDM) data symbols; and
   (b) transmitting, by the apparatus, a side channel communication using said unused bits, wherein the existence of the side channel is communicated to or by the apparatus by using a fixed pattern on a specific OFDM guard tone, wherein the side channel communication is used for link optimization and the link optimization includes providing feedback regarding the quality of a communication channel between said wireless communication devices.

8. The method according to claim 7, wherein the unused bits are pad bits.

9. The method according to claim 7, wherein the wireless OFDM symbols comply with an industry standard for OFDM systems.

10. The method according to claim 7, wherein the existence of the side channel is communicated by using at least one of the following mechanisms: signaling during association; high level signaling after association; a cyclic redundancy check in the data; and a fixed pattern in the data.

11. The method according to claim 7, wherein the side channel communication comprises information that enhances performance of a system that comprises said wireless communication devices.

12. An apparatus for wireless communication, the apparatus comprising:
   a memory; and
   a processor coupled to the memory, wherein the processor is configured to determine one or more guard tones in wireless Orthogonal Frequency Division Multiplexing (OFDM) signals and to transmit a side channel communication on the one or more guard tones, wherein the existence of the side channel is communicated to or by the apparatus using a fixed pattern on a specific OFDIV1 guard tone, wherein the side channel communication comprises feedback to a wireless communication device regarding the quality of a communication channel between the apparatus and the wireless communication device.

13. The apparatus of claim 12, wherein the OFDM signals comply with an industry standard for OFDM signals.

14. The apparatus of claim 12, wherein the existence of the side channel is communicated to or by the apparatus using at least one of the following mechanisms: signaling during association; high level signaling after association; a cyclic redundancy check in the data; and a fixed pattern in the data.

15. The apparatus of claim 12, wherein the side channel communication contains information for link optimization.

16. The apparatus of claim 12, wherein the side channel communication comprises information about the apparatus.

17. The apparatus of claim 12, wherein the side channel communication is used to increase a data rate of wireless communications for the apparatus.

18. The apparatus of claim 12, wherein the side channel communication comprises information that enhances performance of the apparatus.

19. A computer readable non-transitory storage medium encoded thereon with instructions that when executed cause an apparatus to perform a method for providing side channel communication between wireless communication devices, said method comprising:
   determining one or more guard tones in wireless Orthogonal Frequency Division Multiplexing (OFDM) signals; and
   transmitting a side channel communication on the one or more guard tones, wherein the existence of the side channel is communicated to or by the apparatus using a fixed pattern on a specific OFDM guard tone, wherein the side channel communication is used for link optimization and the link optimization includes providing feedback regarding the quality of a communication channel between said wireless communication devices.

20. An apparatus for providing side channel communications between wireless communication devices, the apparatus comprising:
   means for determining one or more guard tones in wireless Orthogonal Frequency Division Multiplexing (OFDM) signals; and
   means for transmitting a side channel communication on the one or more guard tones, wherein the existence of the side channel is communicated to or by the apparatus using a fixed pattern on a specific OFDM guard tone, wherein the side channel communication is used for link optimization and the link optimization includes providing feedback regarding the quality of a communication channel between said wireless communication devices.

21. A wireless transmitter, the wireless transmitter comprising:
   an antenna; and
   a processor configured to determine one or more guard tones in wireless Orthogonal Frequency Division Multiplexing (OFDM) signals and to transmit via the antenna a side channel communication on the one or more guard tones, wherein the existence of the side channel is communicated to or by the wireless transmitter using a used pattern on a specific OFDM guard tone, wherein the side channel communication is use for link optimization and the link optimization includes providing feedback to a wireless communication device regarding the quality of a communication channel between the wireless communication device and the wireless transmitter.

22. An apparatus for providing side channel communication between wireless communication devices, the apparatus comprising:
   a memory; and
   a processor coupled to the memory, wherein the processor is configured to determine unused bits in wireless Orthogonal Frequency Division Multiplexing (OFDM) data symbols and transmit a side channel communication using the unused bits, wherein the existence of the side channel is communicated to or by the apparatus by using a fixed pattern on a specific OFDM guard tone, wherein the side channel communication comprises feedback regarding the quality of a communication channel between the wireless communication devices.

23. The apparatus of claim 22, wherein the unused bits are pad bits.

24. The apparatus of claim 22, wherein the 0FDM symbols comply with an industry standard for OFDM symbols.

25. The apparatus of claim 22, wherein the existence of the side channel is communicated to or by the apparatus using at least one of the following mechanisms: signaling during association; high level signaling after association; a cyclic redundancy check in the data; and a fixed pattern in the data.

26. The apparatus of claim 22, wherein the side channel communication is used for link optimization.

27. A computer readable non-transitory storage medium encoded thereon with instructions that when executed cause an apparatus to perform a method for providing side channel communication between wireless communication devices, said method comprising:
  determining unused bits in wireless Orthogonal Frequency Division Multiplexing (OFDM) data symbols; and
  transmitting a side channel communication using the unused bits, wherein the existence of the side channel is communicated to or by the apparatus by using a fixed pattern on a specific OFDM guard tone, wherein the side channel communication is used for link optimization and the link optimization includes providing feedback regarding the quality of a communication channel between said wireless communication devices.

28. An apparatus for providing side channel communication between wireless communication devices, the apparatus comprising:
  means for determining unused bits in wireless Orthogonal Frequency Division Multiplexing (OFDM) data symbols; and
  means for transmitting a side channel communication using the unused bits, wherein the existence of the side channel is communicated to or by the apparatus by using a fixed pattern on a specific OFDM guard tone, wherein the side channel communication is used for link optimization and the link optimization includes providing feedback regarding the quality of a communication channel between said wireless communication devices.

29. A wireless transmitter, the wireless transmitter comprising:
  an antenna; and
  a processor configured to determine unused bits in wireless Orthogonal Frequency Division Multiplexing (OFDM) data symbols and transmit via the antenna a side channel communication using the unused bits, wherein the existence of the side channel is communicated to or by the wireless transmitter by using a fixed pattern on a specific OFDM guard tone, wherein the side channel communication is used for link optimization and the link optimization includes providing feedback to a wireless communication device regarding the quality of a communication channel between the wireless communication device and the wireless transmitter.

* * * * *